United States Patent

Joy et al.

[11] Patent Number: 5,159,680
[45] Date of Patent: * Oct. 27, 1992

[54] RISC PROCESSING UNIT WHICH SELECTIVELY ISOLATES REGISTER WINDOWS BY INDICATING USAGE OF ADJACENT REGISTER WINDOWS IN STATUS REGISTER

[75] Inventors: William Joy, Palo Alto; Robert B. Garner, San Jose, both of Calif.

[73] Assignee: Sun Microsystems, Inc., Mountain View, Calif.

[*] Notice: The portion of the term of this patent subsequent to Jan. 21, 2009 has been disclaimed.

[21] Appl. No.: 782,670

[22] Filed: Oct. 25, 1991

Related U.S. Application Data

[63] Continuation of Ser. No. 225,343, Jul. 27, 1988, Pat. No. 5,083,263.

[51] Int. Cl.⁵ .............................................. G06F 9/34
[52] U.S. Cl. ..................................... 395/425; 395/800; 395/375; 364/DIG. 1; 364/231; 364/232.8; 364/247; 364/258
[58] Field of Search ......................... 395/375, 800, 425

[56] References Cited

U.S. PATENT DOCUMENTS

| | | | |
|---|---|---|---|
| 4,777,587 | 11/1988 | Case et al. ........................... | 395/375 |
| 4,777,588 | 11/1988 | Case et al. ........................... | 395/800 |
| 4,945,510 | 7/1990 | Maeda et al. ........................ | 395/575 |

OTHER PUBLICATIONS

Tamie et al. "Strategies for Managing the Register File in RISC" Nov. 1983.
Pendelton et al. "A 32-bit Microprocessor for Small talk" Oct. 1986.
A 32-Bit "NMOS Microprocessor with a large register file" Oct. 1986, Serburne et al.
Mokhoff, "Scalable RISC-based architecture yields 10-MIPS workstations" Jul. 9, 1986.
"Reduced Instruction Set Computer Architectures for VLSI", by Manolis G. H. Katevenis, pp. 42≧64, MIT Press, 1985 (215 pages).

Primary Examiner—Thomas C. Lee
Assistant Examiner—Larry Donaghue
Attorney, Agent, or Firm—Blakely Sokoloff Taylor and Zafman

[57] ABSTRACT

An integer processing unit for a reduced instruction set computer having a plurality of registers arranged in groups referred to as register windows, each window register group including a number of input registers, a similar number of output registers, and a number of local registers, the register window groups being physically arranged so the input registers of each group are the same physical register as the output registers of the next adjacent register window group thereby forming one large interconnected ring of register window groups, an arrangement for designating the register window group presently active, and an arrangement for designating register window groups which are not available for use.

6 Claims, 3 Drawing Sheets

RISC PROCESSING UNIT WHICH SELECTIVELY ISOLATES REGISTER WINDOWS BY INDICATING USAGE OF ADJACENT REGISTER WINDOWS IN STATUS REGISTER

This is a continuation of application Ser. No. 07/225,343, filed on Jul. 28, 1988, now U.S. Pat. No. 5,083,263.

BACKGROUND OF THE INVENTION

The present invention relates to apparatus and methods for operating computers, and, more particularly, to data processing apparatus and methods for enhancing the operation of a reduced instruction set computer system.

HISTORY OF THE PRIOR ART

The first computers were really quite simple in concept. They had only a few registers in the central processing unit. To execute a procedure, numbers might be placed in the registers and one added to or subtracted from the other with the result being transferred to memory or left in one of the registers to be further manipulated. Gradually, the capability of computers advanced; it was found that instructions as well as data could be placed in memory and manipulated. Computers acquired more registers and were able to direct results of operations on data and instructions between these registers and to memory. The number of registers continued to increase to make use of the new found capabilities of the machines. Memory became smaller in size, faster, yet much greater in the amount of information it could hold. This increased the complexity of the programs a computer was capable of handling. Eventually, conventional computers came to utilize sixteen or thirty-two registers to process instructions. In these conventional computers, however, it was and is necessary to store the results of any procedure in memory and to restore those results when returning to the procedure. This requirement slows the operation of conventional computers.

As conventional computers increased in power, the tendency was to make machines larger and capable of handling more involved functions by means of hardware. Many processes which were originally required to be programmed were recorded in hardware as microcode.

This tendency resulted for two reasons. First, there was a general feeling that a computer would operate faster if it were to be capable of handling very complicated functions in hardware. Second, there was a desire to reduce the number of bits required to encode a program in memory.

Recently, the premises for these tendencies has been questioned. It has, for example, been determined that most compilers make use of a relatively small number of the functions which are built into hardware. Moreover, computations have shown that many of the advanced conventional computers execute many of their more complicated functions more slowly than the same functions can be executed by machines having much less functional capability in hardware and utilizing longer and simpler instructions.

These findings have given rise to a category of computers called reduced instruction set computers (RISC machines) which are designed for hardware simplicity. An overall philosophy of design of a RISC machine is to eliminate from hardware those functions which are complicated and are infrequently used. Machines of this type tend to use a very large number of registers and to divide the operations of the machine into those operated by instructions each of which can be accomplished in a single machine cycle or faster. RISC machines tend to use little or no microcode. RISC machines tend to maximize the effective operational speed by performing the infrequently executed functions by means of software.

One design of RISC machines has grown from a series of computer chip designs called RISC I and RISC II which originated at the University of California at Berkeley. Machines patterned on the RISC I and II designs utilize a processor which includes an arrangement of registers divided into groups called register windows comprising input registers, local registers, and output registers. Each of these register window groups has a number of registers which would be sufficient to provide the entire working register capability in a conventional computer. The different window groups are then arranged to adjoin one another so that the input registers of one group may be the same registers as the output registers of an adjoining group. This arrangement allows a procedure to execute using one register window and to transfer its results to adjacent procedures without storing and restoring the states of the registers of the original procedure. In this way, transfers may be accomplished between register groups without loss of time and the time for load and store operations in the procedure's operation may be substantially reduced.

In the advanced form of a processor utilizing windowing architecture is one in which the register windows are connected in a ring so that each register window has direct access to two immediately register adjacent windows. A pointer is utilized to select the presently active register window. When a process institutes a procedure call, the pointer moves to the next register window while the local values of the last procedure are retained without the problems of saving to memory and restoring normal to a conventional computer. Similarly, when a procedure returns, the pointer moves to the previous register window and the results of the procedure are immediately available at the output registers of that previous register along with the local values which remain in the local registers of the previous register window. Such a design has been found to reduce the number of load and store operations required to execute a program by thirty to sixty percent over conventional computers and other RISC machines.

A problem encountered in utilizing such advanced windowing arrangements of registers is that there is a point at which the entire series register windows is in use and the normal method of manipulation of such computers no longer applicable. This occurs because when the last register window is selected for use, its output registers are the input registers of the first register window and, as such, have conditions already determined by previous manipulations.

RISC systems of the prior art have solved this problem by utilizing a second pointer to indicate the window at which the operation began so that when that point is reached, the information in the beginning register window may be stored in memory and the window cleared for use by the next procedure.

The present invention utilizes an architecture for solving the problem which enhances the uses to which the entire system may be put and, effectively, allows the computer to be utilized as a RISC computer with windows or as if the computer were multiple conventional computers between which execution could be switched rapidly.

SUMMARY OF THE INVENTION

It is, therefore, an object of the present invention to provide an advanced architecture for reduced instruction set computers which is capable of handling operations requiring more than the number of register window positions which are available in a manner which allows the uses of the computer to be substantially extended.

It is another object of the present invention to provide an architecture for handling some functions within a RISC computer in a manner akin to the handling provided by the more conventional computer.

It is yet another object of the present invention to provide an architecture for efficiently handling multiple tasks or processes within a RISC computer in a manner akin to the handling provided by the multiple conventional computers.

It is an additional, more general, object of this invention to increase the operating ability of RISC computers.

These and other objects are accomplished in accordance with the invention by a computer architecture which includes a central processing unit having an integer unit that performs basic processing functions and has a large number of registers arranged in groups referred to as register windows. Each window register group has a number of input registers, a similar number of output registers, and a number of local registers. The register window groups are physically arranged so the input registers of each group are the same physical registers as the output registers of the next adjacent group to form one large ring or circular processor arrangement, the physical size of which is controlled by the number of register window groups.

The integer unit utilizes a pointer to designate the register window group presently active and a window invalid mask register to designate all register windows which are in use so that these register windows may be marked for overflow and underflow. This new arrangement allows individual register windows to be separated from the other register windows by software blocking of selected register windows. Register windows divided from other windows may thus be operated as though they were conventional computers by themselves. This ability greatly extends the application of RISC computers.

NOTATION AND NOMENCLATURE

The detailed descriptions which follow are presented to a degree in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include reduced instruction set computers or other similar devices. In all cases the distinction between the method operations in operating a computer and the method of computation itself should be borne in mind. The present invention relates, in part, to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. Any algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION

General System Configuration

Figure 1:
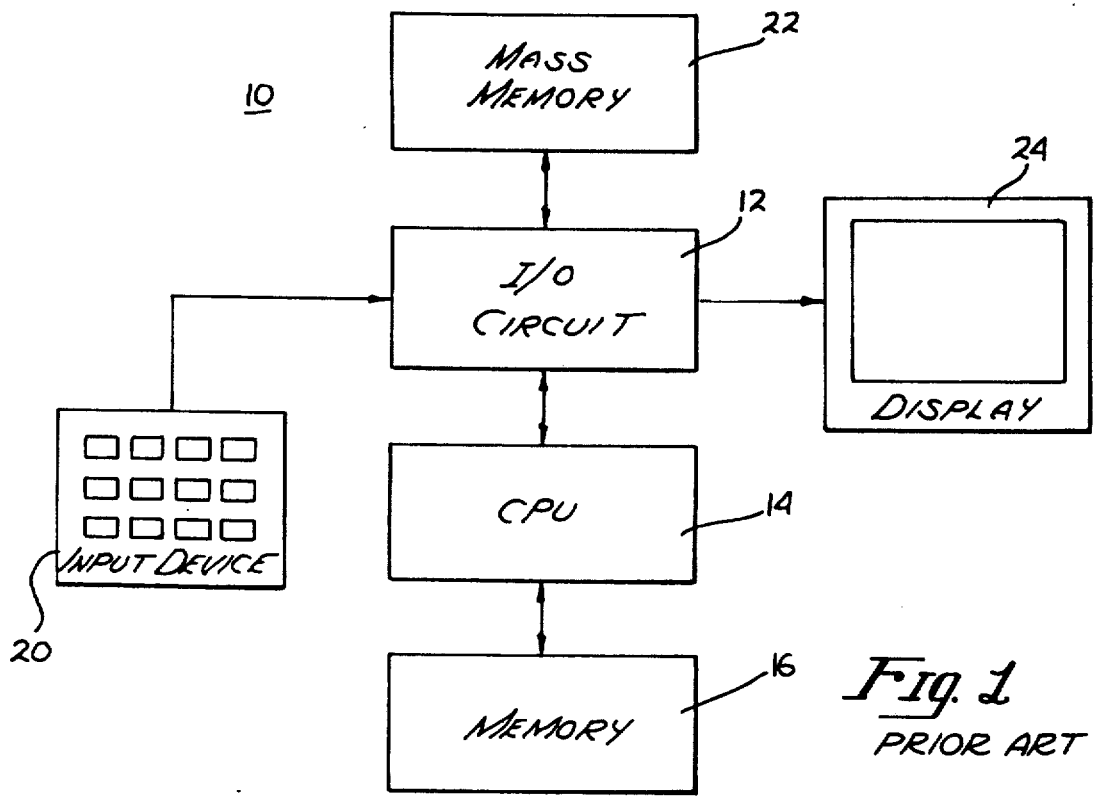
FIG. 1 illustrates in block diagram form a generalized computer system which may utilize the invention.

FIG. 1 shows a typical computer-based system for use according to the present invention. Shown is a computer 10 which comprises an input/output circuit 12 used to communicate information in appropriately structured form to and from the other parts of computer 10 and associated equipment, a central processing unit (CPU) 14, and a memory 16. These components are those typically found in most general and special purpose computers; and the several elements contained within computer 10 are intended to be representative of this broad category of data processors.

FIG. 1 also illustrates an input device 20 shown as a keyboard. It should be understood, however, that the input device 20 may actually be a card reader, a magnetic or paper tape reader, or some other well-known input device such as, of course, another computer. A mass memory device 22 is coupled to the input/output circuit 12 and provides additional storage capability for the computer 10. The mass memory device 22 may be used to store programs, data, and the like and may take the form of a magnetic or paper tape reader or some other well known device. It will be appreciated that the data retained within the mass memory device 22, may, in appropriate cases, be incorporated in standard fashion into computer 10 as part of the memory 16.

In addition, a display monitor 24 is illustrated which is used to display the images being generated by the present invention. Such a display monitor 24 may take the form of any of several well-known varieties of cathode ray tube displays or some other well known type of display.

As is well known, the memory 16 may include programs which represent a variety of sequences of instructions for execution by the central processing unit 14. For example, the control program for implementing the operations and routines described herein to monitor and control programs, disk operating systems, and the like may be stored within the memory 16.

It should, of course, be understood by those skilled in the art that the invention may be practiced by the use of a special purpose digital computer as well as the general purpose computer illustrated in FIG. 1.

Figure 2:
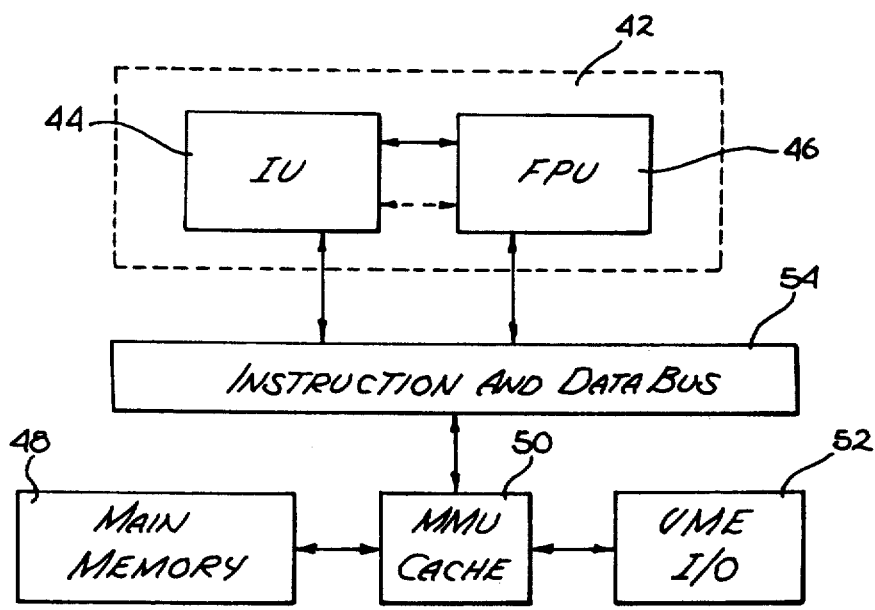
FIG. 2 illustrates in block diagram form a generalized RISC computer system which may utilize the invention.

FIG. 2 illustrates in block diagram form a RISC machine which may be utilized in carrying out the preferred embodiment of the present invention. Shown is a computer 40 which comprises a central processing unit (CPU) 42 including an integer unit (IU) 44 that performs basic processing functions and a coprocessing unit (CU) 46 that performs specialized functions, a main memory 48, a memory management unit (MMU) and a cache for instructions and data 50, an input/output subsystem including a general purpose VME input/output bus 52, and a data and instruction bus 54. These components are those found in the Sun Microsystems 4/200 series of reduced instruction set computers; and the several elements contained within computer 40 are intended to be representative of this category of computer. In the Sun Microsystems 4/200 RISC computers, the coprocessor unit 46 is a floating-point coprocessor, and in this discussion the coprocessing unit is referred to hereafter as floating-point unit 46. Other computers having like capabilities may, of course, be adapted to perform the several functions described below.

The computer 40 of FIG. 2 functions as follows. The integer unit 44 is the basic processor of the system; it executes all of the instructions of the system except for those of the floating point unit 46 which executes floating point arithmetic. A detailed description of the construction and operation of a coprocessor unit which may be utilized with this invention is now U.S. Pat. No. 5,109,514 given in copending patent application Ser. No. 07/225,187, entitled Method and Apparatus for Executing Concurrent Co-Processor Operations and Precisely Handling Related Exceptions, invented by Robert Garner, Kwang Bun Tan, and Donald C. Jackson assigned to the assignee of this invention, and filed on even date herewith. The integer unit 44 receives instruction on the instruction and data bus in an instruction stream. A program counter is utilized to order the operation of the instructions in the integer unit 44. The integer unit 44 extracts floating-point instructions from the instruction stream and places them in the floating-point unit 46.

The preferred embodiment of the integer unit 44 includes a number of registers capable of handling 32 bits of information. The integer unit 44 includes two types of registers, working registers and control/status registers. The working registers are used for normal operations and the control/status registers keep track of and control the state of the integer unit 44.

In the preferred embodiment of the invention, the integer unit 44 includes a processor state register which includes bits designating the currently active register window, a window invalid mask register which indicates those register windows which are in use or otherwise reserved, and a trap base register which responds to trap exception signals generated to provide the address of the particular trap handler to be used when a trap occurs. The integer unit 44 also includes a program counter register and a next program counter register which, respectively, hold the address of the instruction being executed and the address of the next instruction to be executed.

In the preferred embodiment of the invention, most instructions operate using two registers (or one register and a constant) and place the result in a third register. Most instructions for high level language programs execute at rates approaching one instruction per processor clock. The instruction set for the preferred embodiment is a load/store instruction set. Load and store instructions are the only instructions that access memory to load from memory to the registers or to store from the registers to memory. The instructions use two integer registers or one register and a signed value to calculate a memory address. The instruction destination field specifies either an integer unit register, a floating-point register, or another coprocessor register (if used) which supplies the data for a store or receives the data from a load. Register-to-register instructions on the other hand provide all manipulations of data and instructions between registers.

The integer unit may contain from 40 to 520 working registers depending upon the particular implementation of the system. These registers are divided into eight global registers and from two to thirty-two overlapping register windows. The global registers are not part of any register window, and, if used for multiple procedures, must have their results saved and restored as in a conventional computer.

Figure 3:
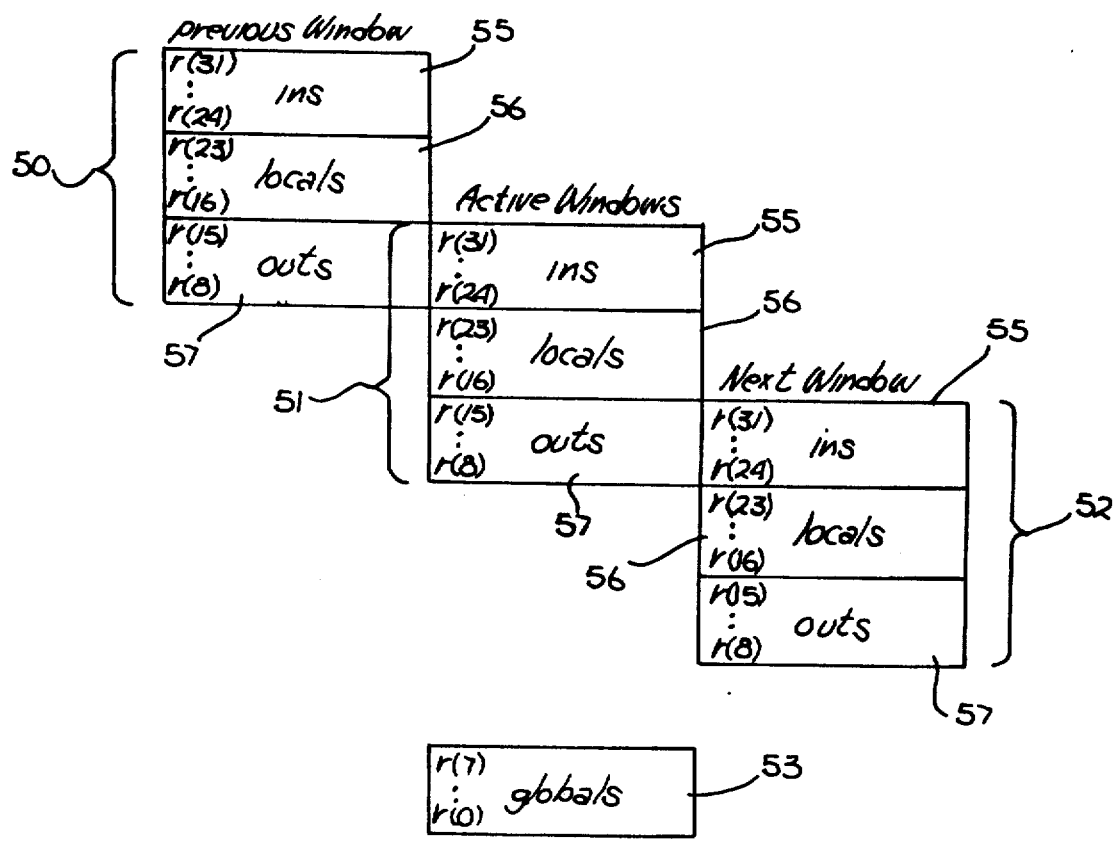
FIG. 3 illustrates in block diagram form a register window arrangement for an integer unit constructed in accordance with the invention.

FIG. 3 illustrates the basic arrangement of register windows. In the figure, three register windows 50, 51, and 52 and one set of global registers 53 are illustrated. Each register window 50-52 contains in the preferred embodiment twenty-four individual registers divided into eight input registers 55, eight local registers 56, and eight output registers 57. At any instant, a program can address the eight global registers 53, and the eight input registers 55, eight local registers 56, and the eight output registers 57 of one register window.

Each individual register in a register window is a 32 bit register in the preferred embodiment of the invention. These registers are physically arranged so that the output registers 57 of one register window (for example, window 50) are the input registers 55 of the next adjoining register window (for example, window 51).

It should be noted that the specific registers used in the preferred embodiment of the invention for globals 53, inputs 55, locals 56, and outputs 57 are specified in FIG. 3. For example, registers internally numbered 0 through 7 are used as global registers 53, registers 8 through 15 as output registers 57, registers 16 through 23 as local registers 56, and registers 24 through 31 as input registers 55.

Figure 6:
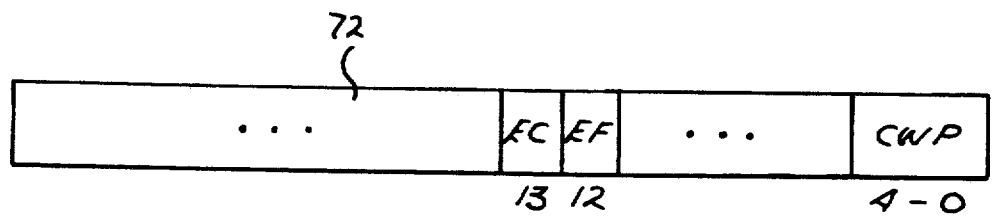
FIG. 6 illustrates a register state register which may be used in practicing the invention.
Figure 4:
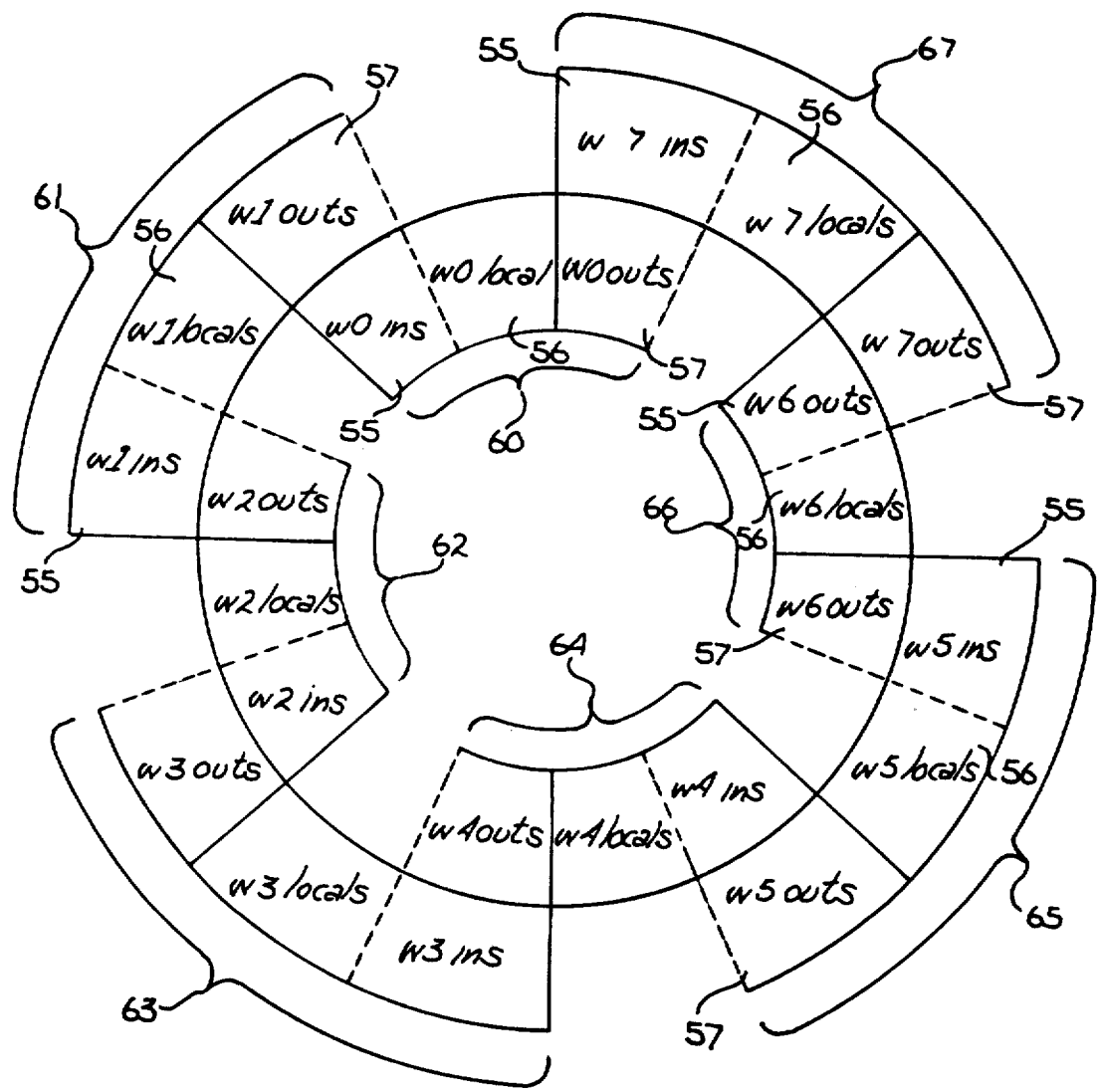
FIG. 4 illustrates in block diagram form a circular register window arrangement for an integer unit constructed in accordance with the invention.

In the preferred embodiment of the invention illustrated in FIG. 4, the register windows are connected in a ring so that the output registers 57 of the last register window 60 are the input registers 55 of the first register window 67. A pointer called the current window pointer (CWP) is stored as five bits in one of the status/control registers (the processor state register 72 illustrated in FIG. 6) and indicates the active window. In the preferred embodiment of the invention, decrementing the current window pointer by one activates the next window while incrementing the pointer by one actives the previous window. In the preferred embodiment, a save instruction decrements the current window pointer by one; a restore instruction increments the current window pointer by one.

In this way, when a process institutes a procedure call, the current window pointer is decremented by one and moves to the next register window while the local values of the last procedure are retained within the previous window without having to save the current registers to memory as with a conventional computer. Similarly, when a procedure returns values resulting from its operation, the current window pointer is incremented by one and designates the previous register window; moreover, the results of the procedure are immediately available at the output registers of that previous register along with the local values which remain in the local registers of the previous register window.

Register windows with overlapping inputs and outputs have several advantages. One of these is that the number of load and store operations required to execute a program is reduced over that required in a system utilizing a fixed number of registers. For one thing, the values in registers need not be stored and cleared between procedures, because when using this architecture the next register window is usually clear. Moreover, no load operation is required to go from one procedure to the next because the inputs of the next register window are the outputs of the preceding window.

Prior art RISC machines utilized a pointer called the save window pointer to designate the first register window in the integer unit. As the register windows were used, the current window pointer position was compared to the position of the save window pointer. When the two fell in the same window, an overflow or underflow was about to occur, and it was necessary to store in memory the information in the window which was next to be selected so that the window could be utilized for the current procedure. This method of determining when an overflow was about to occur allows the processor to continue on and utilize more window positions than are actually in the processor, although it slows the system by requiring saves to memory and the consequent restoring as the procedures return.

As a specific example, in FIG. 4, if register window 67 is the first register window and is thus the beginning of a process and enough procedures have been implemented so that register windows 67, 66, 65, 64, 63, 62, and 61 are in use, then the next procedure call will designate register window 60. However, the output registers 57 of register window 60 are the input registers 55 of register window 67 and are not available for use. Thus, the information in the input registers 55 and the local registers 56 of the register window 67 must be saved and the register window 67 cleared so that the procedure may be implemented.

Figure 5:
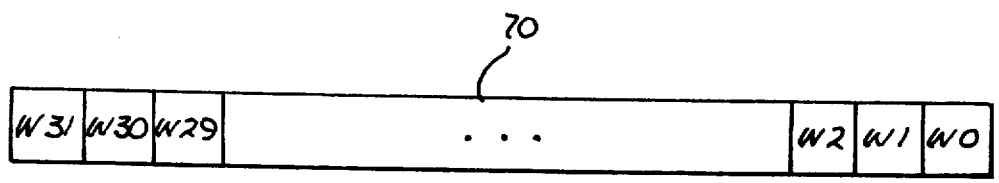
FIG. 5 illustrates a window invalid mask register which may be used in practicing the invention.

The present invention accomplishes the same purpose but provides substantially more facility to a RISC computer. Instead of the save window pointer, the present invention utilizes a thirty-two bit register, the window invalid mask register, to store through software control indications of any window which contains information regarding a procedure. Such a register is illustrated generally in FIG. 5. The register 70 shown in the figure includes a bit for each register window which might be utilized in an arrangement having thirty-two register windows. Obviously, in arrangements using less than this number of register windows, all bits of the register need not be utilized.

When the first register window of a processor is used, that indication is marked by a bit in the window zero (W0) position of the window invalid marker register 70. Thus, if during the execution of a program, the integer unit has used the entire number of register windows and is about to use the first register window, a comparison of the current window pointer and the window invalid mask register 70 shows that the window (W0) next to be selected is in use and its contents must be switched out to memory before it may be used. As with prior art systems, additional register windows may also be utilized for additional procedures so long as their contents are switched out to memory before use so that they may be later restored. This use of the window invalid mask register 70 is effectively the same use as that of the prior art.

However, the window invalid mask register 70 may also be used to control other areas of the register file which are available for use. For example, the window invalid mask register 70 may be used to store more than just the number of the register window at which the process begins; it may be used to designate any register window as invalid. By using software to mark in the window invalid mask register 70 that the register windows on either side of a single register window are in use, the intermediate register window may be effectively isolated from the remainder of the register windows.

Moreover, this process is facilitated in the preferred embodiment because of the particular way in which traps are implemented. In the preferred embodiment, when an attempt is made to begin a procedure and the current window pointer is compared to the window invalid mask for the next register window, if the register window is marked invalid, the trap handler does not recognize that the window is invalid and uses the input and local registers of the invalid register window to handle the trap. Consequently, the isolated register window may be operated in the same manner as a conventional computer and is provided with all the assets it needs including built-in trap handlers to accomplish its operations. The thirty-two registers of that register window may thus be utilized for various procedures and the results of the procedures swapped to memory where and when necessary as in a conventional computer.

This facility of the invention is especially useful for handling real time operations or other operations in which results must be produced very rapidly. For example, if the window invalid mask register is used to indicate that alternate register windows are in use, then the integer unit can be considered to be equivalent to a number of individual conventional computers each of which may be assigned a different task. The arrangement of the present invention allows the rapid switching between these "individual computers" without the necessity of storing their results before the next task can be begun that is required for real time operations to be conveniently handled.

The physical construction of the devices involved in implementing the invention is well known to the prior art. The specific details of the implementation of the system described herein and the instructions which may be utilized are set forth in *The SPARC Architecture Manual*, Version 7, Revision A, published by Sun Microsystems, Inc., 2550 Garcia Avenue, Mountain View, Calif. Additional details regarding the architecture of the system are given in *The Scalable Processor Architecture (SPARC)*, Robert Garner, et al., Digest of Papers of the 33rd Annual IEEE Computer Society International Conference (Spring COMPCON 88), Feb. 29-Mar. 4, 1988, San Francisco, Calif.

Although the invention has been described with reference to particular arrangements and systems, it will be apparent to those skilled in the art that the details of those arrangements and systems are used for illustrative purposes and should not be taken as limitations of the invention. It will be clear that the methods and apparatus of this invention have utility in any application where coprocessors might be utilized. It is, thus, to be contemplated that many changes and modifications may be made by those of ordinary skill in the art without departing from the scope and spirit of the invention.

We claim:

1. A method for selectively isolating a register window in a processing unit for executing procedures in a reduced instruction set computer, said processing unit comprising a plurality of registers arranged in register groups, each of said register groups comprising a number of input registers, a number of output registers, and a number of local registers, said register groups physically arranged such that the input registers of each group are the same registers as the output registers of the next adjacent register group thereby forming a ring of register groups, said method comprising the steps of:

storing in a status register, for each register group, an indication of whether that particular register group is in use;

selectively isolating a first register group from the remaining register groups by predesignating in said status register that a second register group on a first side of said first register group is in use, and predes-ignating in said status register that a third register group on a second side of said first register group is in use;

separately utilizing said first register group for processing.

2. The method for selectively isolating a register window in a processing unit as provided in claim 1, wherein said step of separately utilizing said first register group for processing includes: utilizing the input and the local registers of said second register group for handling trap routines.

3. The method for selectively isolating a register window in a processing unit as provided in claim 2, wherein said step of separately utilizing said first register group for processing further includes: utilizing the output and the local registers of said third register group for handling trap routines.

4. A method for selectively isolating a contiguous block of register windows groups in a processing unit for executing procedures in a reduced instruction set computer, said processing unit comprising a plurality of registers arranged in register groups, each of said register groups comprising a number of input registers, a number of output registers, and a number of local registers, said register groups physically arranged such that the input registers of each group are the same registers as the output registers of the next adjacent register group thereby forming a ring of register groups, said method comprising the steps of:

storing in a status register, for each register group, an indication of whether that particular register group is in use;

selectively isolating a contiguous block of register groups from the remaining register groups by predesignating in said status register that a first register group on a first side of said contiguous block is in use, and predesignating in said status register that a second register group on a second side of said contiguous block is in use;

separately utilizing said contiguous block of register groups for processing.

5. The method for selectively isolating a contiguous block of register groups as provided in claim 4, wherein said step of separately utilizing said contiguous block of a plurality of register windows for processing includes: utilizing the input and the local registers of said first register group for handling trap routines.

6. The method for selectively isolating a contiguous block of register groups as provided in claim 5, wherein said step of separately utilizing said contiguous block of register groups for processing further includes: utilizing the output and the local registers of said second register group for handling trap routines.

* * * * *